(12) United States Patent
Lee et al.

(10) Patent No.: US 11,469,410 B2
(45) Date of Patent: Oct. 11, 2022

(54) ELECTRODE ASSEMBLY AND RECHARGEABLE BATTERY INCLUDING THE SAME

(71) Applicant: SAMSUNG SDI CO., LTD., Yongin-si (KR)

(72) Inventors: Sangjun Lee, Yongin-si (KR);
Bokhyun Ka, Yongin-si (KR);
Kyeuyoon Sheem, Yongin-si (KR);
Jinhyon Lee, Yongin-si (KR);
Donghyuk Chang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 41 days.

(21) Appl. No.: 16/461,529

(22) PCT Filed: Nov. 28, 2017

(86) PCT No.: PCT/KR2017/013646
§ 371 (c)(1),
(2) Date: May 16, 2019

(87) PCT Pub. No.: WO2018/101696
PCT Pub. Date: Jun. 7, 2018

(65) Prior Publication Data
US 2019/0355972 A1 Nov. 21, 2019

(30) Foreign Application Priority Data
Nov. 29, 2016 (KR) .......................... 10-2016-0160663

(51) Int. Cl.
*H01M 4/133* (2010.01)
*H01M 4/131* (2010.01)
(Continued)

(52) U.S. Cl.
CPC ........... *H01M 4/133* (2013.01); *H01M 4/131* (2013.01); *H01M 4/587* (2013.01);
(Continued)

(58) Field of Classification Search
CPC ...... H01M 4/133; H01M 4/131; H01M 4/587; H01M 10/0431; H01M 10/0587; H01M 2004/027
See application file for complete search history.

(56) References Cited

U.S. PATENT DOCUMENTS

2010/0015514 A1   1/2010   Miyagi et al.
2013/0177792 A1   7/2013   Takahata et al.
(Continued)

FOREIGN PATENT DOCUMENTS

CN   103119774 A   5/2013
CN   103367709 A   10/2013
(Continued)

OTHER PUBLICATIONS

Extended European Search Report dated Jun. 15, 2020, of the corresponding European Patent Application No. 17877017.8 and the references cited therein.
(Continued)

*Primary Examiner* — Cynthia H Kelly
*Assistant Examiner* — Jenna Shulman
(74) *Attorney, Agent, or Firm* — Lee IP Law, P.C.

(57) ABSTRACT

An exemplary embodiment of the present invention provides a spiral-wound electrode assembly including: a negative electrode and a positive electrode, each of which is configured to include a substrate, and a first composite material and a second composite material formed on opposite surfaces of the substrate; and a separator disposed between the negative electrode and the anode, wherein the first composite material of the negative electrode is disposed farther
(Continued)

away from a center of the electrode assembly than the second composite material of the negative electrode, and the first composite material of the negative electrode is oriented with respect to a first surface of the substrate of the negative electrode.

11 Claims, 3 Drawing Sheets

(51) Int. Cl.
    *H01M 4/587*     (2010.01)
    *H01M 10/04*     (2006.01)
    *H01M 10/0587*     (2010.01)
    *H01M 4/02*     (2006.01)

(52) U.S. Cl.
    CPC ... *H01M 10/0431* (2013.01); *H01M 10/0587* (2013.01); *H01M 2004/027* (2013.01)

(56) References Cited

U.S. PATENT DOCUMENTS

| | | | |
|---|---|---|---|
| 2013/0230749 A1 | 9/2013 | Kim et al. | |
| 2013/0260217 A1 | 10/2013 | Matsui et al. | |
| 2014/0065478 A1 | 3/2014 | Mitsuhashi et al. | |
| 2014/0141305 A1 | 5/2014 | Muraoka et al. | |
| 2014/0170454 A1 | 6/2014 | Kwon et al. | |
| 2014/0170487 A1 | 6/2014 | Takahata et al. | |
| 2015/0030931 A1* | 1/2015 | Takahata | H01M 4/587 429/231.8 |
| 2016/0118658 A1 | 4/2016 | Kawakami et al. | |

FOREIGN PATENT DOCUMENTS

| | | |
|---|---|---|
| CN | 103733390 A | 4/2014 |
| CN | 103891012 A | 6/2014 |
| EP | 1939971 A1 | 7/2008 |
| JP | 3443227 B2 | 9/2003 |
| JP | 4713068 B2 | 6/2011 |
| JP | 2013-069432 A | 4/2013 |
| JP | 5704413 B2 | 4/2015 |
| KR | 10-2012-0086270 A | 8/2012 |
| KR | 10-2013-0111339 A | 10/2013 |
| KR | 10-2013-0143644 A | 12/2013 |
| KR | 10-2014-0044914 A | 4/2014 |

OTHER PUBLICATIONS

International Search Report for PCT/KR2017/013646 filed Nov. 28, 2017.
Chinese Office Action dated Aug. 23, 2021, and the accompanying Search Report dated Aug. 15, 2021, of the corresponding Chinese Patent Application No. 201780073801.2.
Chinese Office Action (2$^{nd}$) dated Feb. 17, 2022 for corresponding Chinese Patent Application No. 201780073801.2.
EPO Office action dated Apr. 28, 2022 for corresponding European Patent Application No. 17877017.8.

* cited by examiner

ELECTRODE ASSEMBLY AND RECHARGEABLE BATTERY INCLUDING THE SAME

CROSS-REFERENCE TO THE RELATED APPLICATION

This is the U.S. national phase application based on PCT Application No. PCT/KR2017/013646, filed Nov. 28, 2017, which is based on Korean Patent Application No. 10-2016-0160663, filed Nov. 29, 2016, the entire contents of all of which are hereby incorporated by reference.

TECHNICAL FIELD

The present invention relates to electrode assembly, and more particularly, to an electrode assembly for a rechargeable battery and a rechargeable battery including the same.

BACKGROUND ART

A rechargeable lithium battery, which has recently been spotlighted as a power source for portable electronic devices, has a discharge voltage that is twice as high as that of a conventional battery using an aqueous alkaline solution, by using an organic electrolyte solution, resulting in high energy density.

The rechargeable battery may include an electrode assembly in which a negative electrode, a separator, and a positive electrode are repeatedly stacked, or a jelly-roll electrode assembly formed by stacking a negative electrode, a separator, and a positive electrode, and then winding them. Since the jelly-roll electrode assembly repeatedly forms the negative electrode, the separator, and the positive electrode, a non-uniform reaction may occur due to different circumferences from the center to the outer periphery of the electrode assembly.

As such, a reaction between the positive electrode and the negative electrode non-uniformly occurs, and the cycle-life of the rechargeable battery may be partially reduced by a phenomenon such as overcharging or overvoltage.

DISCLOSURE

Technical Problem

An exemplary embodiment of the present invention has been made in an effort to provide an electrode assembly and a rechargeable battery capable of increasing cycle-life of the rechargeable battery by allowing a reaction in the rechargeable battery to uniformly occur.

Technical Solution

An exemplary embodiment of the present invention provides a spiral-wound electrode assembly including: a negative electrode and a positive electrode, each of which is configured to include a substrate, and a first composite material and a second composite material formed on opposite surfaces of the substrate; and a separator disposed between the negative electrode and the anode, wherein the first composite material of the negative electrode is disposed farther away from a center of the electrode assembly than the second composite material of the negative electrode, and the first composite material of the negative electrode is oriented with respect to a first surface of the substrate of the negative electrode.

The first composite material of the positive electrode may be disposed adjacent to the center of the electrode assembly relative to the second composite material of the positive electrode.

The first composite material of the negative electrode and the first composite material of the positive electrode may be disposed at sides that are opposite to each other with the separator interposed therebetween, and the first composite material of the negative electrode may be disposed adjacent to the center of the electrode assembly relative to the first composite material of the positive electrode.

The second composite material of the negative electrode and the second composite material of the positive electrode may be disposed at sides that are opposite to each other with the separator interposed therebetween, and the second composite material of the positive electrode may be disposed adjacent to the center of the electrode assembly relative to the second composite material of the negative electrode.

The first and second composite materials of the negative electrode may contain a carbon-based negative active material, and the first and second composite materials of the negative electrode may have a degree of divergence (DD) defined by Equation 1. A difference between the DD of the first composite material of the negative electrode and the DD of the second composite material may be 10 or more. In this case, the DD of the first composite material of the negative electrode may be in a range of 19 to 60, inclusive, and the DD of the second composite material of the negative electrode may be in a range of 5 to less than 19.

$$DD \text{ (Degree of Divergence)} = (I_a/I_{total}) \times 100 \quad \text{[Equation 1]}$$

(In Equation 1, $I_a$ indicates a sum of peak intensities at non-planar angles when XRD is measured using a CuKα line, and $I_{total}$ indicates a sum of peak intensities at all angles when XRD is measured using the CuKα line).

The carbon-based negative active material may be formed of artificial graphite or a mixture of artificial graphite and natural graphite, and may further includes a Si-based material, and a Sn-based material or a LiMOx-based material (M=metal).

The electrode assembly may further include a center pin, and the electrode assembly may be spirally wound around the center pin.

An exemplary embodiment of the present invention provides a rechargeable battery including: the electrode assembly; a case configured to accommodate the electrode assembly therein; and an electrolyte solution accommodated in the case together with the electrode assembly.

Advantageous Effects

As such, according to the exemplary embodiments of the present invention, it is possible to provide an electrode assembly and a rechargeable battery capable of increasing cycle-life of the rechargeable battery by allowing a reaction in the rechargeable battery to uniformly occur.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, since sizes and thicknesses of constituent members shown in the accompanying drawings are arbitrarily given for better understanding and ease of description, the present invention is not limited to the illustrated sizes and thicknesses.

In the drawings, the thicknesses of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements.

Figure 1:
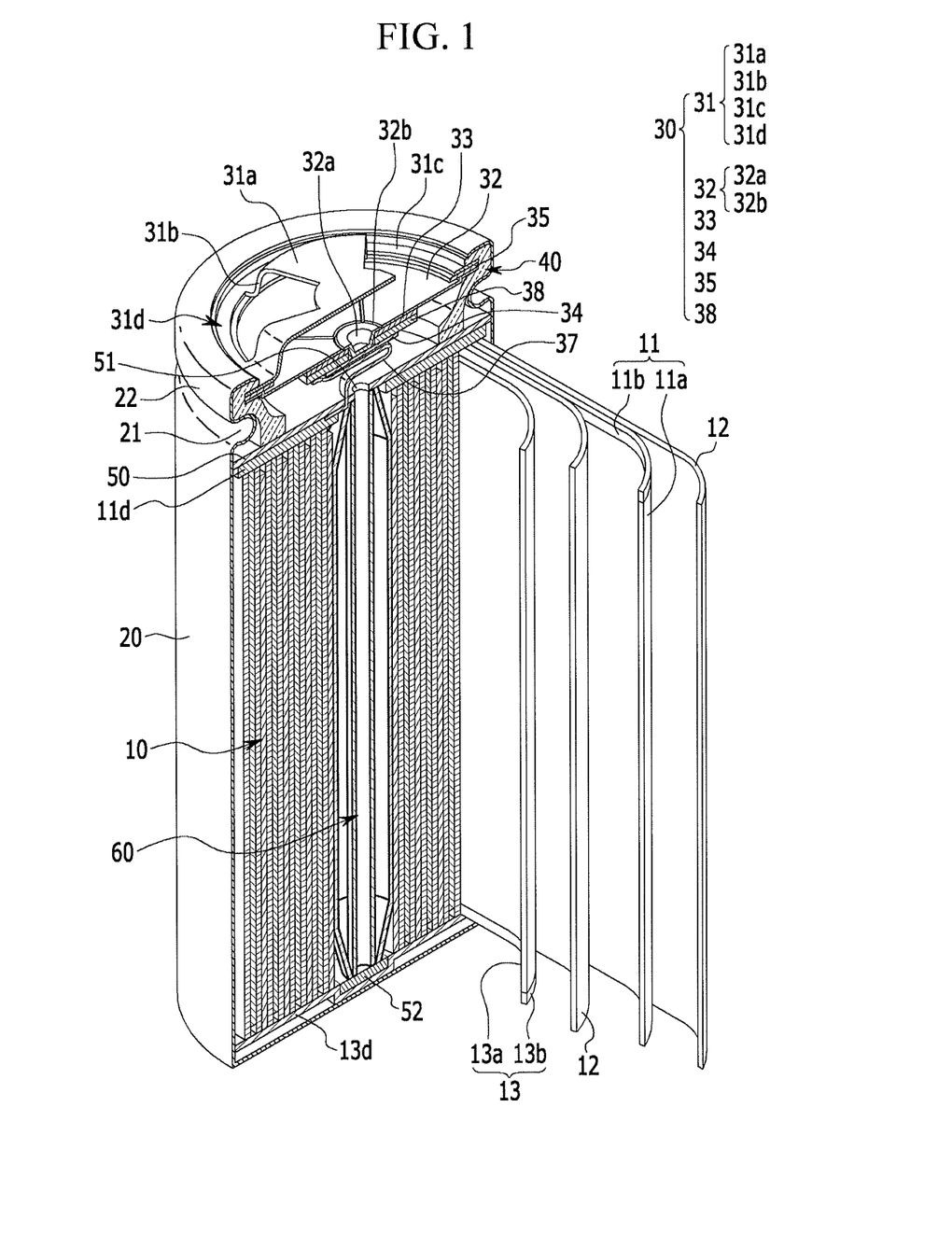
FIG. 1 illustrates a cross-sectional view of a rechargeable battery according to an exemplary embodiment of the present invention.
Figure 2:
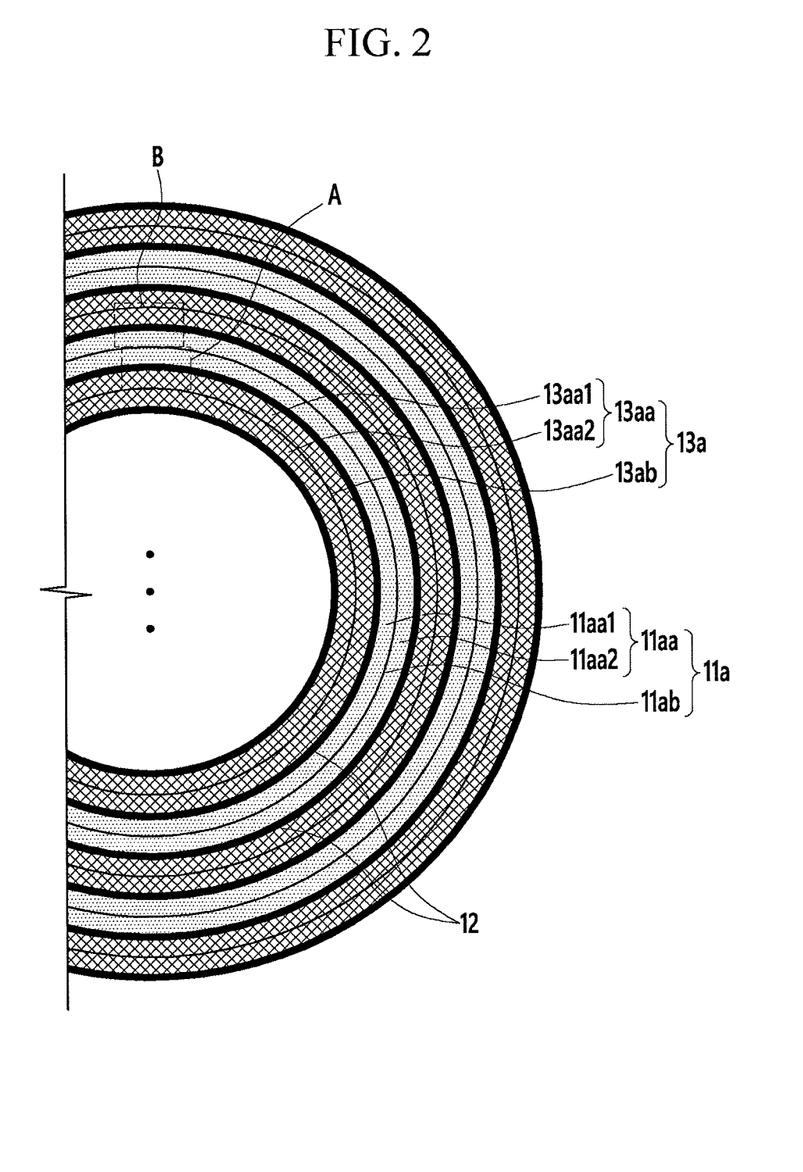
FIG. 2 illustrates a cross-sectional view of a portion of an electrode assembly of FIG. 1.
Figure 3:
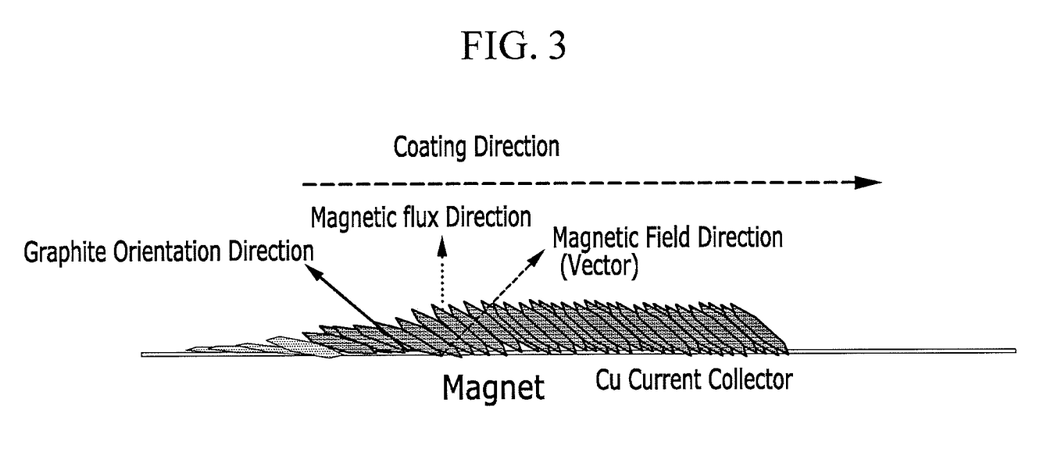
FIG. 3 illustrates a schematic view for describing an orientation of a negative electrode active material according to an exemplary embodiment of the present invention.

FIG. 1 illustrates a cross-sectional view of a rechargeable battery according to an exemplary embodiment of the present invention, FIG. 2 illustrates a cross-sectional view of a portion of an electrode assembly of FIG. 1, and FIG. 3 illustrates a schematic view for describing an orientation of a negative electrode active material according to an exemplary embodiment of the present invention.

As illustrated in FIG. 1, according to the exemplary embodiment of the present invention, the rechargeable battery includes an electrode assembly 10, a case 20 configured to accommodate the electrode assembly 10 therein, a top assembly 30 coupled to an opening of the case 20 with a gasket interposed therebetween and electrically connected to the electrode assembly 10, an insulating plate 50 provided between the cap assembly 30 and the cap assembly 10, and a center pin 60 disposed at a center of the electrode assembly 10.

The electrode assembly 10 includes a positive electrode 11, a separator 12, and a negative electrode 13 which are sequentially stacked. The separator 12 is disposed between the positive electrode 11 and the negative electrode 13 to insulate them from each other. The electrode assembly 10 may be a cylindrical jelly-roll type formed by stacking the positive electrode 11, the separator 12, and the negative electrode 13 and spirally winding them around the center pin 60.

As the separator 12, polyethylene, polypropylene, polyvinylidene fluoride, or a multilayer of two or more thereof may be used, or a mixed multilayer such as a two-layer separator of polyethylene/polypropylene, a three-layer separator of polyethylene/polypropylene/polyethylene, a three-layer separator of polypropylene/polyethylene/polypropylene, etc. may be used.

The positive electrode 11 and the negative electrode 13 respectively include electrode active regions 11a and 13a formed by coating an active material on a thin plate formed of a metal foil, and electrode uncoated regions 11b and 13b formed without coating an active material thereon. The electrode uncoated region 11b of the positive electrode and the electrode uncoated region 13b of the negative electrode may be disposed at opposite end portions of the electrode assembly 10.

Specifically, referring to FIG. 2, the electrode active region 11a of the positive electrode may be formed by coating a positive composite material 11aa made of a positive active material on a first substrate 11ab made of a metal foil such as aluminum. The positive composite material may include a first composite material 11aa1 and a second composite material 11aa2 that are respectively formed on opposite surfaces of the first substrate.

As the positive active material, a compound capable of reversible intercalation and deintercalation of lithium (a lithiated intercalation compound) may be used. For example, at least one of composite oxides of lithium and a metal selected from cobalt, manganese, nickel, and combinations thereof may be used. In the positive electrode, a content of the positive active material may be 90 wt % to 98 wt % with respect to a total weight of the positive composite material.

In an exemplary embodiment of the present invention, the positive composite material 11aa may further include a binder and a conductive material. In this case, a content of the binder and the conductive material may be 1 wt % to 5 wt % with respect to the total weight of the positive composite material.

The binder serves to facilitate adhering of the positive active materials to each other and to facilitate adhering the positive active material to a current collector. Representative examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene butadiene rubber, acrylated styrene butadiene rubber, an epoxy resin, nylon, and the like, but the present invention is not limited thereto.

The conductive material is used to impart conductivity to the electrode, and any electronic conductive material that does not cause a chemical change in the battery may be used.

The electrode active region 13a of the negative electrode may be formed by coating a negative composite material 13aa made of an active material such as graphite or carbon on a second substrate 13ab made of a metal foil such as copper or nickel. The negative composite material 13aa may include a first composite material 13aa1 and a second composite material 13aa2 formed on opposite sides of the second substrate 13ab.

The negative composite material 13aa may include a carbon-based negative active material, and the first composite material 13aa1 and the second composite material 13aa2 may have a degree of divergence (DD) defined by Equation 1 below. The DD of the first composite material may be in a range of 19 to 60, inclusive, and the DD of the second composite material may be in a range of 5 to less than 19.

$$DD \text{ (Degree of Divergence)} = (I_a/I_{total}) \times 100 \quad \text{[Equation 1]}$$

In Equation 1, $I_a$ indicates a sum of peak intensities at non-planar angles when XRD is measured using a CuKα line, and $I_{total}$ indicates a sum of peak intensities at all angles when XRD is measured using CuKα line.

In this case, the non-planar angle indicates $2\theta = 42.4 \pm 0.2°$, $43.4 \pm 0.2°$, $44.6 \pm 0.2°$, and $77.5 \pm 0.2°$, i.e., a (100) plane, a (101)R plane, a (101)H plane, and a (110) plane, when XRD is measured using the CuKα line. Generally, graphite is classified into a hexagonal structure and a rhombohedral structure having an ABAB stacking sequence depending on a stacking order of a graphene layer, and the R plane indicates the rhombohedral structure, while the H plane indicates the hexagonal structure.

All the angles indicates 2θ=26.5±0.2°, 42.4±0.2°, 43.4±0.2°, 44.6±0.2°, 54.7±0.2°, and 77.5±0.2°, i.e., a (002) plane, a (100) plane, a (101)R plane, a (101)H plane, a (004) plane, and a (110) plane, when XRD is measured using the CuKα line. The peak appearing at 2θ=43.4±0.2° may be seen as overlapping peaks corresponding to the (101)R plane of the carbon-based material and the (111) plane of the current collector, e.g., Cu.

In general, a peak intensity value indicates a peak height value or an integral area value of a peak, and the peak intensity value according to one embodiment means an integral area value of a peak.

In the exemplary embodiment of the present invention, the XRD measurement is performed using the CuKα line as a target line, and the target line is extracted using a monochromator device to improve a peak intensity resolution. In this case, measurement conditions are 2θ=10° to 80°, a scan speed (°/S) of 0.044 to 0.089, and a step size (°/step) of 0.026.

According to the exemplary embodiment of the present invention, the DD is obtained by discharging the rechargeable lithium battery including the negative electrode and then measuring the XRD of the negative electrode obtained by dismantling the battery in a fully discharged state. In this case, the charge and discharge conditions are 0.1 to 0.2C and one to two times.

For the negative electrode, a peak intensity ratio of the (004) plane of the negative electrode, that is, I(004)/I(002), may be in a range of 0.04 or more, and 0.04 to 0.07 inclusive when XRD is measured using the CuKα line. When the $I_{004}/I_{002}$ of the negative electrode is 0.04 or more, a DC internal resistance may not be increased, a rate characteristic, particularly a high rate characteristic, may be improved, and a cycle-life characteristic may be improved.

According to the exemplary embodiment of the present invention, the DD indicates a degree to which each negative active material of the first composite material 13aa1 and the second composite material 13aa2 of the negative electrode is oriented at a certain angle, and a difference between a first DD of the first composite material and a second DD of the second composite material may be 10 or more. In this case, the DD of the first composite material 13aa1 may be in a range of 19 to 60, inclusive, and the DD of the second composite material 13aa2 may be in a range of 5 to less than 19. For example, when the DD of the first composite material 13aa1 is 19, the DD of the second composite material 13aa2 is 9 or less, and when the DD of the second composite material 13aa2 is 18, the DD of the first composite material 13aa1 may be 28 or more.

This indicates that the negative active material of the first composite material 13aa1 is relatively more oriented than the negative active material of the second composite material 13aa2. In this case, the first composite material 13aa1 may be disposed farther from a center of the electrode assembly 10 than the second composite material 13aa2 with regard to the second substrate 13ab. This value is a property value maintained even after charging and discharging.

As such, as illustrated in FIG. 3, the first composite material of the negative electrode may be oriented by coating the negative active material on the second substrate and then using a magnetic field. In this case, the degree of orientation may be controlled by adjusting intensity of the magnetic field, an exposure time of the magnetic field, viscosity of the negative active material composition, a rolling strength, and density of the composite material. A negative active material slurry having viscosity of 2300 cps (in this case, the temperature is 25° C.) is prepared by mixing 97.5 wt % of artificial graphite, 1.5 wt % of styrene-butadiene rubber, and 1 wt % of carboxymethyl cellulose in an aqueous solvent.

Then, a copper foil is positioned on a magnet having a magnetic field strength of 4000 Gauss, and then the negative active material slurry is coated on the copper foil and is exposed to a magnetic field for 9 seconds. Thereafter, the magnetic field is removed and the negative active material slurry is dried and rolled, so a first composite material having the DD of 39 can be produced. On the other hand, when the negative active material slurry is coated on the copper foil, dried, and then rolled, a second composite material having the DD of 18 can be produced.

When a coating process is performed while moving a negative substrate, a magnetic field (magnetic flux) caused by a magnet is generated in a direction that is perpendicular to the negative substrate, but the direction in which the magnetic field is generated has a certain angle depending on a coating speed (a speed at which the negative substrate moves) as a vector function, and thus the negative active material of the negative active material composition may have such a shape so as to be erected at a certain angle with respect to a surface of the negative substrate, i.e., to be oriented.

In addition, when the DD of the first composite material 13aa1 of the negative electrode is in a range of 19 to 60 inclusive as in the exemplary embodiment of the present invention, this indicates that the negative active material is sufficiently oriented to facilitate the movement of Li ions within the negative electrode without lying horizontally with respect to one surface of the second substrate 13ab. Therefore, the second composite material 13aa2 having a relatively smaller DD as compared with the first composite material 13aa1 is more oriented than the first composite material 13aa1. The second composite material 13aa2 may not be subjected to a separate orientation process after the coating of the negative active material. Therefore, in the second composite material 13aa2, the movement of Li ions may not be smoothly performed, so that the DC internal resistance may be large as compared to the first composite material 13aa1.

Referring again to FIG. 2, when a circular jelly-roll type is formed, the first composite material 13aa1 of the negative electrode is positioned adjacent to the center of the electrode assembly 10 relative to the first member 11aa1 of the positive electrode, and thus an area of the positive electrode may be larger in terms of a radius of curvature to relatively reduce a N/P (positive electrode capacity/negative electrode capacity) ratio, which results in an increase in a risk that deterioration such as lithium precipitation may occur.

Accordingly, in the present invention, the movement of Li ions may be facilitated by increasing the degree of orientation of the first composite material 13aa1 of the negative electrode that is positioned closer to the center of the electrode assembly 10 relative to the first composite material 11aa1 of the positive electrode so as to reduce ion resistance, and thus deterioration such as lithium precipitation, which may be caused by the relatively low N/P ratio, may be suppressed, thereby improving the cycle-life as well as the safety of the rechargeable battery.

In this case, since the electrode assembly is formed by repeatedly winding the positive electrode 11, the separator 12, and the negative electrode 13, the first composite material 13aa1 of the negative electrode and the first composite material 11aa1 of the positive electrode may be disposed at positions that are opposite to each other with the separator 12 therebetween, and the first composite material 13aa1 of the negative electrode may be positioned adjacent to the center of the electrode assembly 10 relative to the first composite material 11aa1 of the positive electrode (see portion A). The second composite material 13aa2 of the negative electrode and the second composite material 11aa2 of the positive electrode may be disposed opposite to each other with the separator 12 therebetween, and in this case, the second composite material 11aa2 of the positive electrode may be positioned adjacent to the center of the electrode assembly 10 relative to the second composite material 13aa2 of the negative electrode (see portion B)

When the rechargeable lithium battery is charged, lithium ions are discharged from the positive electrode and inserted into the negative electrode, and in this case, when a site in the negative electrode which can receive the lithium ions from the positive electrode is small, a problem such as lithium precipitation occurs. This problem is caused by loading level (L/L) variations of positive/negative electrodes and an increase in resistance during the reaction.

Accordingly, the electrode assembly 10 is formed such that the negative electrode capacity is larger than the positive electrode capacity, and the N/P ratio, which is a numerical value thereof, has a value of 1.0 to 1.2 in a typical rechargeable lithium battery. In the electrode assembly 10, which is formed by being repeatedly wound like a cylindrical battery, an area A (e.g., N/P=1.05) in which the negative electrode capacity is relatively slightly larger than the positive electrode capacity and an area B (e.g., N/P=1.10) in which the negative electrode capacity is relatively significantly larger than the positive electrode capacity may exist. This is because the electrode assembly 10 is formed by being repeatedly wound, and thus circumferences of the negative electrode and the positive electrode are different, and in the present invention, they are disposed such that the first composite material 13aa1 of the negative electrode is positioned in the area A in which the negative electrode capacity is relatively slightly larger than the positive electrode capacity.

The first composite material 13aa1 of the negative electrode is oriented in a certain direction as compared with the second composite material of the negative electrode 13aa2 of the negative electrode, and thus the movement of Li ions is smoothly performed in the first composite material 13aa1 of the negative electrode as compared with the negative electrode 13aa2 of the negative electrode, whereby the resistance is reduced to increase the negative electrode capacity.

A BET specific surface area of the negative electrode composite material may be less than 3.0 m$^2$/g, or may be in a range of 0.6 m$^2$/g to 1.2 m$^2$/g. When the BET specific surface area of the negative electrode material mixture 13aa is less than 3.0 m$^2$/g, the electrochemical cycle-life characteristic of cells may be improved.

The BET measurement was performed by charging/discharging the rechargeable lithium battery including the negative electrode, dismantling the battery in a completely discharged state, cutting the thus-obtained negative electrode into a predetermined size, placing it in a BET sample holder, and measuring it with a nitrogen gas adsorption method.

The negative electrode may have a single-sided loading level (L/L) of 6 mg/cm$^2$ to 65 mg/cm$^2$.

The carbon-based negative active material may be formed of artificial graphite or a mixture of artificial graphite and natural graphite. When a crystalline carbon-based material, which is formed of a mixture of artificial graphite or artificial graphite and natural graphite, is used as the negative electrode active material, the crystallographic characteristic of particles may be more improved than those of the amorphous carbon-based active material, so as to further improve an orientation property of the carbon material inside an electrode plate for an external magnetic field. A form of the artificial graphite or natural graphite may be amorphous, plate-like, flake, spherical, fibrous, or a combination thereof, and may be in any form. When the artificial graphite and the natural graphite are mixed, the mixing ratio may be 70:30 to 95:5 wt %.

In addition, the negative composite material may further include at least one of a Si-based negative active material, a Sn-based negative active material, or a LiMOx-based negative active material (M=metal). When the negative composite material further includes a carbon-based negative active material as the first negative active material and the negative active material as the second negative active material, the mixing ratio of the first and second negative active materials may be 50:50 to 99:1 wt %.

The LiMOx-based negative active material may be a lithium vanadium oxide (M=metal).

The Si-based negative active material may be Si, a Si—C composite, SiOx (0<x<2), or a Si-Q alloy (Q is an element selected from the group consisting of an alkali metal, an alkaline earth metal, a Group 13 element, a Group 14 element, a Group 15 element, a Group 16 element, a transition metal, a rare earth element, and a combination thereof), and the Sn-based negative active material may include Sn, SnO$_2$, and a Sn—R alloy (R is an element selected from the group consisting of an alkali metal, an alkaline earth metal, a Group 13 element, a Group 14 element, a Group 15 element, a Group 16 element, a transition metal, and a rare earth element, and does not include Sn), and at least one of them may be mixed with SnO$_2$. The element Q and the element R may be at least one element selected from the group consisting of Mg, Ca, Sr, Ba, Ra, Sc, Y, Ti, Zr, Hf, Rf, V, Nb, Ta, Db, Cr, Mo, W, Sg, Pb, Pt, Cu, Ag, Au, Zn, Cd, B, Al, Ga, Sn, In, Tl, Ge, P, As, Sb, Bi, S, Se, Te, Po, and a combination thereof.

A content of the negative active material in the negative composite material 13aa may be 95% to 99% wt based on a total weight of the negative composite material.

The negative composite material 13aa includes a binder, and may optionally further include a conductive material. A content of the binder in the negative composite material may be 1 wt % to 5 wt % based on the total weight of the negative composite material. In addition, when the conductive material is further included, the negative active material may be used in an amount of 90 wt % to 98 wt %, the binder may be used in an amount of 1 wt % to 5 wt %, and the conductive material may be used in an amount of 1 wt % to 5 wt %.

The binder serves to facilitate adhering negative active material particles to each other, and also to facilitate adhering the negative active material to the negative substrate. As the binder, a non-aqueous binder, an aqueous binder, or a combination thereof may be used.

Examples of the non-aqueous binder may include polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, polyamideimide, polyimide, or a combination thereof.

Examples of the aqueous binders may include styrene-butadiene rubber, acrylated styrene-butadiene rubber (SBR), acrylonitrile-butadiene rubber, acryl rubber, butyl rubber, an ethylene-propylene copolymer, polyepichlorohydrin, polyphosphazene, polyvinyl pyridine, chlorosulfonated polyethylene, latex, a polyester resin, an acryl resin, a phenol resin, an epoxy resin, a polyvinyl alcohol, an acrylate resin, or a combination thereof.

When the aqueous binder is used as a negative electrode binder, a cellulose-based compound capable of imparting viscosity may be further contained as a thickener. As the cellulose-based compound, carboxymethyl cellulose, hydroxypropylmethyl cellulose, methyl cellulose, an alkali metal salt thereof, or the like may be used in combination. As the alkali metal, Na, K, or Li may be used. A content of the thickener may be 0.1 to 3 parts by weight based on 100 parts by weight of the negative active material.

The conductive material is used to impart conductivity to the electrode, and any electronic conductive material that does not cause a chemical change in the battery may be used. Examples of the conductive material may include a carbon-based material such as natural graphite, artificial graphite, carbon black, acetylene black, ketjen black, and carbon fiber; a metal powder such as copper, nickel, aluminum, and silver; a metal-based material such as metal fiber; a conductive polymer such as polyphenylene derivative; and a conductive material containing a mixture thereof.

Referring again to FIG. 1, the electrode assembly 10 may be accommodated in the case 20 together with the electrolyte solution, and the electrolyte solution includes a non-aqueous organic solvent and a lithium salt.

The non-aqueous organic solvent serves as a medium through which ions involved in the electrochemical reaction of the battery can move.

The lithium salt is dissolved in an organic solvent to act as a source of lithium ions in the battery to enable operation of a basic rechargeable lithium battery and to promote the movement of lithium ions between the positive electrode and the negative electrode. Representative examples of the lithium salt include one or more supporting electrolyte salts selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(CxF_{2x+1}SO_2)$, $C_yF_{2y+1}SO_2$) (wherein x and y are natural numbers, e.g., 1 to 20), LiCl, LiI, and $LiB(C_2O_4)_2$ (lithium bis(oxalato) borate: LiBOB). A concentration of the lithium salt is preferably within a range of 0.1 M to 2.0 M. When the concentration of the lithium salt is within the above range, the electrolytic solution may have appropriate conductivity and viscosity, so as to exhibit excellent electrolyte performance, and to allow lithium ions to effectively move.

In the jelly-roll state, a positive current collector plate 11d is connected to the electrode uncoated region 11b of the positive electrode of the electrode assembly 10, and a negative current collector plate 13d is connected to the electrode uncoated region 13b of the negative electrode of the electrode assembly 10.

The positive current collector plate 11d is formed to be narrower than the negative current collector plate 13d so that the negative current collector plate 13d is in contact with the case 20 while the positive current collector plate 11d is spaced apart from the case 20 to not be in contact therewith.

A lead tab 37 is electrically connected to the positive current collector plate 11d. One end of the lead tab 37 may be welded to the positive current collector plate 11d and the other end may be electrically connected to the cap assembly 30. The lead tabs 37 may be bent to face one surface of the electrode assembly 10 in order to increase a contact area with the cap assembly 30.

An insulating plate 50 having an opening exposing the center pin 60 is disposed on the positive current collector plate 11d. The insulating plate 50 is formed to be larger than the positive current collector plate 11d so as to contact an inner surface of the case 20. When the insulating plate 50 is formed to be larger than the positive current collector plate 11d as described above, a certain gap is formed between the positive current collector plate 11d and the case 20 by a width of protrusion of the insulating plate 50 out of the positive current collector plate 11d. The gap between the positive current collector plate 11d and the case 20 may serve to prevent a phenomenon in which the positive current collector plate 11d and the case 20 come into contact with each other to form a short circuit.

The lead tab 37 may be connected to a first auxiliary plate 34 of the electrode assembly 10 to be described later through an opening 51 of the insulating plate 50.

Since the electrode assembly 10 is wound around the center pin 60, the center pin 60 may be positioned at the center of the electrode assembly 10 to be aligned with a direction in which the electrode assembly 10 is inserted into the case 20. The center pin 60 maintains a shape that is at least deformed or approximates the shape before deformation when subjected to a whole surface compression load or a local impact load acting on the outside of the rechargeable battery.

The center pin 60 may be formed of a material having certain rigidity, e.g., a metal, so as to be minimally deformed against an external impact. When the center pin 60 is formed of a metal having conductivity, opposite ends of the center pin 60 are installed to be electrically insulated from the positive current collector plate 11d and the negative current collector plate 13d.

For example, an insulating pad 52 may be disposed between a lower end of the center pin 60 and the negative current collector plate 13d corresponding thereto. An upper end of the center pin 60 extends through a through hole formed at the center of the positive current collector plate 11d in an insulated state, and is supported by the insulating plate 50. In this case, the upper end of the center pin 60 may be spaced apart from the through hole of the positive current collector plate 11d, or an insulating member (not illustrated) may be interposed therebetween. Accordingly, the movement of the center pin 60 in the longitudinal direction of the center pin 60 is limited, and the center pin 60 may be maintained in a stable state at the center of the electrode assembly 10.

The case 20 may have an open side into which the electrode assembly 10 is inserted, and may be formed to have substantially a same shape, e.g., a cylindrical shape, as the electrode assembly 10. The case 20 may be connected to the negative current collecting plate 13d of the electrode assembly to serve as a negative terminal of the rechargeable battery. Accordingly, the case 20 may be formed of a conductive metal such as aluminum, an aluminum alloy, or nickel-plated steel.

The cap assembly 30 is disposed at the opening of the case 20, and is coupled to the case 20 with a gasket 40 therebetween. The gasket 40 insulates the case 20 from the cap assembly 30, and seals the inside of the case 20 accommodating the electrode assembly 10 and the electrolyte solution.

Specifically, the cap assembly 30 includes a cap plate 31, a positive temperature coefficient element 35, a vent plate 32, an insulation member 33, a first auxiliary plate 34, and a second auxiliary plate 38.

The first auxiliary plate 34 may be electrically connected to the lead tab 37 of the electrode assembly, and may be coupled to the lead tab 37 by welding.

The second auxiliary plate 38 may be stacked on the first auxiliary plate 34 to be electrically connected to the first auxiliary plate 34, and may be coupled to the first auxiliary plate 34 by welding. The second auxiliary plate 38 may be disposed at the center of the electrode assembly 10 corresponding to the center pin 60 to have a through hole exposing the first auxiliary plate 34.

The vent plate 32 is disposed above the second auxiliary plate 38 with the insulation member 33 therebetween. An edge of the vent plate 32 may be inserted into the gasket 40 to be coupled to the case 20.

The vent plate 32 includes a vent 32a disposed at a portion corresponding to the center pin 60. The vent 32a protrudes from the vent plate 32 toward the electrode assembly 10, and is electrically connected to the first auxiliary plate 34 by being in contact therewith through the through hole. The vent plate 32 may have a notch 32b around the vent 32a to guide breakage of the vent 32a.

The vent 32a may cut off the electrical connection with the first auxiliary plate 34 by being broken under a predetermined pressure condition to release an internal gas to the outside. That is, when the internal pressure of the case 20 rises due to the generation of the gas, the notch 32b may be broken beforehand to allow the gas to be discharged to the outside through an exhaust port 31d to be described later, thereby preventing the rechargeable battery from exploding.

In addition, when the vent 32a is broken due to an abnormal reaction, the electrical connection between the vent plate 32 and the first auxiliary plate 34 is broken. Accordingly, the electrical connection between the cap plate 31 electrically connected to the vent plate 32 and the first auxiliary plate 34 is broken, and thus no more current flows.

The cap plate 31 includes a center plate 31a corresponding to the center pin 60 which is the center of the electrode assembly 10, a plurality of branch portions 31b extending from the center plate 31a toward the gasket 40, and a coupling plate 31c inserted and coupled into the gasket 40 to connect ends of the branch portions 31b. The exhaust port 31d is formed between adjacent branch portions 31b, which are opened to the outside.

The branch 31b is connected to the center plate 31a in a bent state from the coupling plate 31c so that a center of the cap plate 31 can protrude to the outside of the case 20. The cap plate 31 may be electrically connected to the positive collector plate 11d through the vent plate 32, the second auxiliary plate 38, the first auxiliary plate 34, and the lead tab 37, so as to be used as a positive terminal of the rechargeable battery. Therefore, the connection with a terminal of an external device may be facilitated by forming the center of the cap plate 31 to protrude to the outside of the case 20.

Meanwhile, a PTC element may be formed along a second plate of the cap plate 31, and may be inserted and coupled into the gasket 40 while being stacked between the second plate of the cap plate and an edge of the vent plate.

The positive temperature element 35 may be installed between the cap plate 31 and the vent plate 32 to control a current flow between the cap plate 31 and the vent plate 32 depending on an internal temperature of the rechargeable battery.

When the internal temperature is within a predetermined range, the positive temperature element 35 acts as a conductor to electrically connect the cap plate 31 and the vent plate 32. If the internal temperature exceeds the predetermined temperature, the positive temperature element 35 has electrical resistance that increases to infinity. As a result, the positive temperature element 35 may block the flow of a charged or discharged current between the cap plate 31 and the vent plate 32.

The edge of the cap assembly 30 is inserted into the opening of the case 20 after being inserted into the gasket 40 in a form where the vent plate 32, the positive temperature element 35, and the cap plate 31 are stacked. Then, the cap assembly 30 is clamped to the opening of the case 20 through a clamping process. In this case, a beading portion 21 that is recessed in a radial central direction of the case 20 and a clamping portion 22 that clamps an outer circumference of the gasket 40 into which the cap assembly 30 is inserted may be formed on the case 20.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

DESCRIPTION OF SYMBOLS

10: electrode assembly 11: positive electrode
11a, 13a: electrode active region 11b, 13b: electrode uncoated region
11aa: positive composite material 11aa1, 13aa1: first composite material
11aa2, 13aa2: second composite material 11ab: first substrate
11d: positive current collecting plate 12: separator
13: negative electrode 13aa: negative composite material
13ab: second substrate 13d: negative current collecting plate
20: case 21: beading portion
22: clamping portion 30: cap assembly
31: cap plate 31a: center plate
31b: branch 31c: coupling plate
31d: exhaust port 32: vent plate
31a: vent 32b: notch
33: insulating member 34: first auxiliary plate
35: positive temperature element 37: lead tab
38: second auxiliary plate 40: gasket
50: insulating plate 51: opening
52: insulating pad 60: center pin

The invention claimed is:
1. A spiral-wound electrode assembly, comprising:
a negative electrode and a positive electrode, each of which includes a substrate, and a first composite material and a second composite material on opposite surfaces of the substrate; and
a separator disposed between the negative electrode and the positive electrode,
wherein the first composite material of the negative electrode is only on a first surface of the substrate of the negative electrode, and the second composite material of the negative electrode is only on a second surface of the substrate of the negative electrode, the first and second surfaces being opposite surfaces of the substrate, wherein the second composite material of the negative electrode is between the substrate of the negative electrode and a center of the electrode assembly, and wherein a degree of orientation of the first composite material of the negative electrode is at a larger angle than that of the second composite material of the negative electrode with respect to the substrate of the negative electrode.

2. The electrode assembly as claimed in claim 1, wherein the first composite material of the positive electrode is disposed adjacent to the center of the electrode assembly relative to the second composite material of the positive electrode.

3. The electrode assembly as claimed in claim 2, wherein the first composite material of the negative electrode and the first composite material of the positive electrode are disposed at sides that are opposite to each other with the separator interposed therebetween, and the first composite material of the negative electrode is disposed adjacent to the center of the electrode assembly relative to the first composite material of the positive electrode.

4. The electrode assembly as claimed in claim 2, wherein the second composite material of the negative electrode and the second composite material of the positive electrode are disposed at sides that are opposite to each other with the separator interposed therebetween, and the second composite material of the positive electrode is disposed adjacent to the center of the electrode assembly relative to the second composite material of the negative electrode.

5. The electrode assembly as claimed in claim 1, wherein:
the first and second composite materials of the negative electrode contain a carbon-based negative active material, and each of the first and second composite materials of the negative electrode has a degree of divergence (DD) defined by Equation 1, and a difference between the DD of the first composite material of the negative electrode and the DD of the second composite material of the negative electrode is 10 or more:

$$DD \text{ (Degree of Divergence)} = (I_a/I_{total}) \times 100 \quad \text{[Equation 1]}$$

(in Equation 1, $I_a$ indicates a sum of peak intensities at non-planar angles when XRD is measured using a CuKα line, and $I_{total}$ indicates a sum of peak intensities at all angles when XRD is measured using a CuKα line).

6. The electrode assembly as claimed in claim 5, wherein the DD of the first composite material is in a range of 19 to 60, inclusive, and the DD of the second composite material is in a range of 5 to less than 19.

7. The electrode assembly as claimed in claim 5, wherein the carbon-based negative active material is formed of artificial graphite or a mixture of artificial graphite and natural graphite.

8. The electrode assembly as claimed in claim 7, wherein the carbon-based negative active material includes at least one of a Si-based negative active material, a Sn-based negative active material, and a LiMOx-based negative active material (M=metal).

9. The electrode assembly as claimed in claim 1, wherein the electrode assembly further includes a center pin, and the electrode assembly is spirally wound around the center pin.

10. A rechargeable battery comprising:
the electrode assembly according to claim 1;
a case to accommodate the electrode assembly therein; and
an electrolyte solution accommodated in the case together with the electrode assembly.

11. The electrode assembly as claimed in claim 1, wherein only the first composite material of the first and second composite materials of the negative electrode is magnetized after coating on the substrate of the negative electrode.

* * * * *